STAATS, SCHWANKE & STADLER.
Land Roller.
No. 90,131.
Patented May 18, 1869.
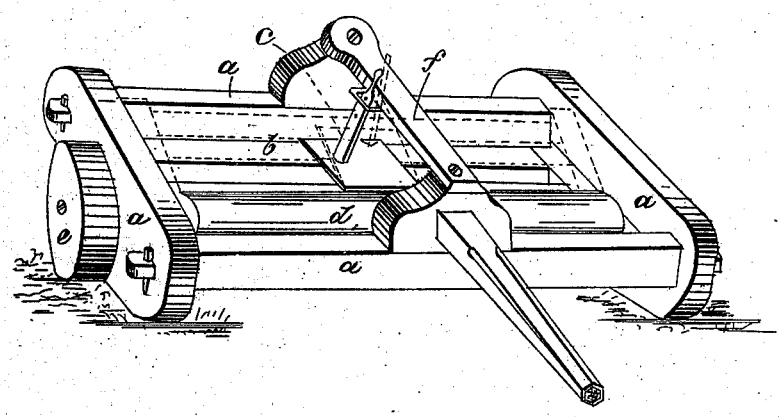
Witnesses:
Inventors:
William H. Staats
August C. Schwanke
Lucas Stadler
Attorney

United States Patent Office.

WILLIAM H. STAATS AND AUGUST C. SCHWANKE, OF LA PRAIRIE, AND LUCAS STADLER, OF BOWEN, ILLINOIS.

Letters Patent No. 90,131, dated May 18, 1869.

IMPROVEMENT IN LAND-ROLLER.

The Schedule referred to in these Letters Patent and making part of the same.

*To whom it may concern:*

Be it known that we, WILLIAM H. STAATS and AUGUST C. SCHWANKE, of La Paririe, in the county of Adams, and LUCAS STADLER, of Bowen, in the county of Hancock, and State of Illinois, have invented a new and useful Improvement in Land-Rollers; and we do declare that the following is a true and accurate description thereof, reference being had to the accompanying drawings, and to the letters of reference marked thereon, and being a part of this specification.

The nature of this invention relates to an improved construction of that class of agricultural implements known as land-rollers; and consists in so hanging the roller in a frame, that it may be elevated or depressed, as may be necessary.

In the drawings—

$a$ represents the frame, made of two longitudinal bars, framed into two transverse timbers. This frame is supported upon suitable wheels $e$, by means of proper journals or bearings.

The roller $d$ is pivoted near the front of the inside frame $b$, which, in turn, is pivoted to the transverse timbers of the frame $a$ in such a manner that the front part of the frame, with the roller attached, will be the heaviest.

A brace, $f$, extends across the top of the frame $a$, as shown, and may be provided with a proper seat for the use of the driver.

A lever, $c$, secured at its lower end to the frame $b$, near its rear side, and projecting upward by the side of the brace $f$, and near the driver's seat, enables the operator to elevate or depress the roller at pleasure. The lever $c$ may be held in position by any convenient or suitable device.

The lever $c$ being pushed downward, depresses the rear of the frame $b$, and elevates the roller $d$, when said roller will be clear of the ground, and may be transported upon its wheels.

Pulling up the lever elevates the rear of the frame, and depresses the roller, allowing it to act upon the ground.

What we claim as our invention, and desire to secure by Letters Patent, is—

The arrangement of the frames $a$ and $b$, lever $c$, roller $d$, wheels $e$, and brace $f$, or their equivalents, when constructed and operating substantially as and for the purposes herein described.

WILLIAM H. STAATS.
AUGUST C. SCHWANKE.
LUCAS STADLER.

Witnesses:
W. H. BURKE,
JOHN SPENCE.